(12) United States Patent
Hasebe et al.

(10) Patent No.: US 8,835,068 B2
(45) Date of Patent: Sep. 16, 2014

(54) FUEL CELL

(75) Inventors: Hiroyuki Hasebe, Chigasaki (JP);
Nobuyasu Negishi, Yokohama (JP);
Koichi Kawamura, Yokohama (JP);
Shigeo Fukuda, Yokohama (JP); Motoi Goto, Yokohama (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 13/364,919

(22) Filed: Feb. 2, 2012

(65) Prior Publication Data

US 2012/0135328 A1 May 31, 2012

Related U.S. Application Data

(63) Continuation of application No. PCT/JP2010/062931, filed on Jul. 30, 2010.

(30) Foreign Application Priority Data

Aug. 7, 2009 (JP) .................................. 2009-184773

(51) Int. Cl.
*H01M 8/04* (2006.01)
*H01M 8/10* (2006.01)

(52) U.S. Cl.
CPC ........ *H01M 8/04201* (2013.01); *H01M 8/1011* (2013.01); *Y02E 60/523* (2013.01)
USPC .......................................... 429/443; 429/513

(58) Field of Classification Search
USPC .......................................... 429/443, 480, 513
See application file for complete search history.

(56) References Cited

U.S. PATENT DOCUMENTS

| 6,387,559 | B1 | 5/2002 | Koripella et al. |
| 2006/0194092 | A1 | 8/2006 | Kanai et al. |
| 2006/0194093 | A1 | 8/2006 | Kibune et al. |
| 2007/0154768 | A1 | 7/2007 | Watanabe et al. |
| 2007/0275277 | A1 | 11/2007 | Peng et al. |

FOREIGN PATENT DOCUMENTS

| CN | 101278922 | 10/2008 |
| JP | 2005-332687 | 12/2005 |
| JP | 2006-49201 | 2/2006 |

(Continued)

OTHER PUBLICATIONS thefreedictionary.com definition of the word "fixedly".*

(Continued)

*Primary Examiner* — Ula C Ruddock
*Assistant Examiner* — Frank Chernow
(74) *Attorney, Agent, or Firm* — Finnegan, Henderson, Farabow, Garrett & Dunner, LLP (57) ABSTRACT

According to one embodiment, a fuel cell includes an electric-power generator, a fuel distribution mechanism, and a pump. The electric-power generator includes a membrane electrode assembly including an anode, a cathode, and an electrolytic membrane. The fuel distribution mechanism includes a container and a thin tube. The container includes a fuel discharge surface, and contains the electric-power generator inside. The thin tube is formed in the container in a manner that a fuel outlet and a fuel inlet communicate with each other. The pump is connected directly to the fuel inlet.

7 Claims, 5 Drawing Sheets

(56) References Cited

FOREIGN PATENT DOCUMENTS

| | | |
|---|---|---|
| JP | 2006-244716 | 9/2006 |
| JP | 2006-269413 | 10/2006 |
| JP | 2007-109442 | 4/2007 |
| JP | 2008-210611 | 9/2008 |
| JP | 2008-235243 | 10/2008 |
| JP | 2009-158420 | 7/2009 |
| WO | WO 2006/121169 | 11/2006 |
| WO | WO 2008/081576 | 7/2008 |

OTHER PUBLICATIONS

International Search Report from Japanese Patent Office for International Application No. PCT/JP2010/062931, mailed Oct. 5, 2010.

Notification of the First Office Action issued by the Chinese Patent Office in CN 201080018332.2, dated Jul. 23, 2013 and its English language translation.

Extended European Search Report, issued by European Patent Office, mailed Nov. 11, 2013, in European Patent Application No. 10806399.1 (6 pages).

* cited by examiner

FUEL CELL

CROSS REFERENCE TO RELATED APPLICATIONS

This application is a Continuation Application of PCT Application No. PCT/JP2010/062931, filed Jul. 30, 2010 and based upon and claiming the benefit of priority from prior Japanese Patent Application No. 2009-184773, filed Aug. 7, 2009, the entire contents of which are incorporated herein by reference.

FIELD

Embodiments described herein relate generally to a fuel cell.

BACKGROUND

In recent years, attempts are made to use fuel cells as power supplies for personal computers and mobile electronic devices such as cellular phones. Fuel cells make portable electronic devices usable for a long time without charging. Fuel cells are advantageous in that electric power can be generated by simply supplying a fuel and air and can be continuously generated by simply charging or replacing the fuel only. Therefore, if downsizing can be achieved, fuel cells can be said to be extremely effective for long time use of portable electronic devices.

Particularly, a direct methanol fuel cell (DMFC) is promising as power supply for small devises because the DMFC can be downsized and handling of a fuel is also easy compared with a hydrogen gas fuel.

Known as methods of supplying the DMFC with a fuel are a gas-supply-type DMFC in which a liquid fuel is vaporized and fed into a fuel cell by a blower and the like, a liquid-supply-type DMFC in which a liquid fuel is directly fed into a fuel cell by a pump, and an inner-vaporization-type DMFC in which a liquid fuel is vaporized inside a cell. Of these methods, the liquid-supply-type DMFC is known by its technology of connecting a fuel cell to a fuel tank through a tube. The foregoing technology is described in, for example, Jpn. Pat. Appln. KOKAI Publication No. 2008-235243. Further, technology of providing a pump between a fuel cell and a fuel tank and connecting the fuel cell to the pump as well as the fuel tank to the pump is disclosed.

Since the fuel cell described above can be fed with a fuel by a pump when required, controllability of a fuel supply amount can be improved. However, there is a case that the fuel cell and the pump cannot be connected through a tube to prevent leakage of a fuel. Even if such a connection can be made to prevent leakage of a fuel, the fuel can leak for any reason, e.g., vibration and impact which act on the fuel cell may cause the tube to fall off or a connection part to be loosened or damaged. Further, if the tube is crushed, fuel feed may be interrupted.

Therefore, there are demands for a highly reliable fuel cell which prevents leakage of a fuel and interruption of fuel supply.

DETAILED DESCRIPTION

In general, according to one embodiment, there is provided a fuel cell comprising an electric-power generator, a fuel distribution mechanism, and a pump. The electric-power generator comprises a membrane electrode assembly. The membrane electrode assembly comprises an anode, a cathode, and an electrolytic membrane held between the anode and the cathode. The fuel distribution mechanism comprises a container and a thin tube. The container comprises a fuel discharge surface opposed to the anode, is open in a side opposed to the fuel discharge surface, and contains the electric-power generator inside. The thin tube is formed in the container in a manner that a fuel outlet provided by partially opening the fuel discharge surface and a fuel inlet provided by partially opening an outer surface of the container communicate with each other. The pump is attached to the outer surface of the container, connected directly to the fuel inlet, and configured to feed a fuel to the fuel inlet.

Hereinafter, the fuel cell according to an embodiment will be described in detail with reference to the drawings. In the embodiment, a direct-methanol fuel cell will be described.

Figure 1:
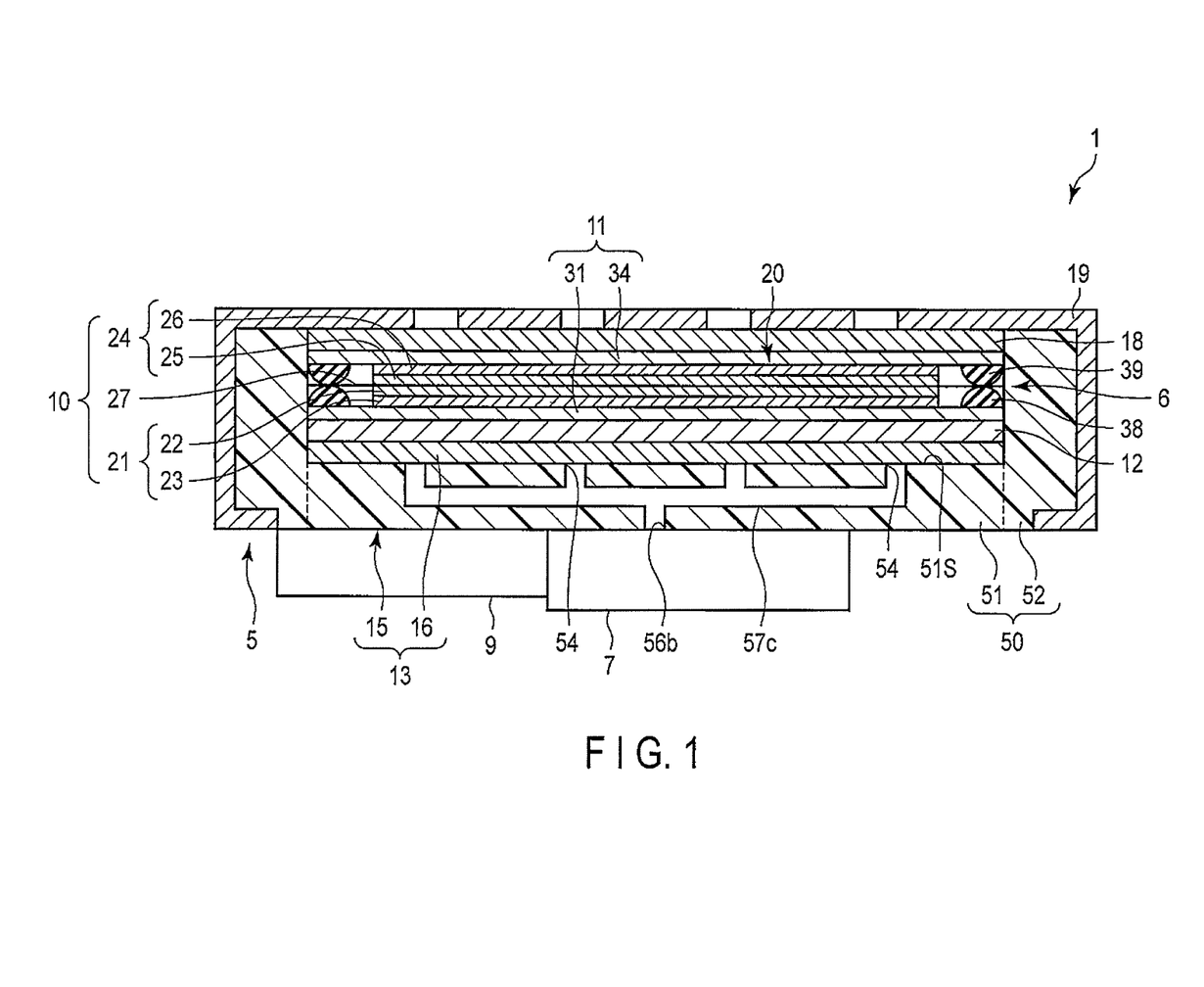
FIG. 1 is a cross-sectional view showing a fuel cell module of a fuel cell according to an embodiment.
Figure 2:
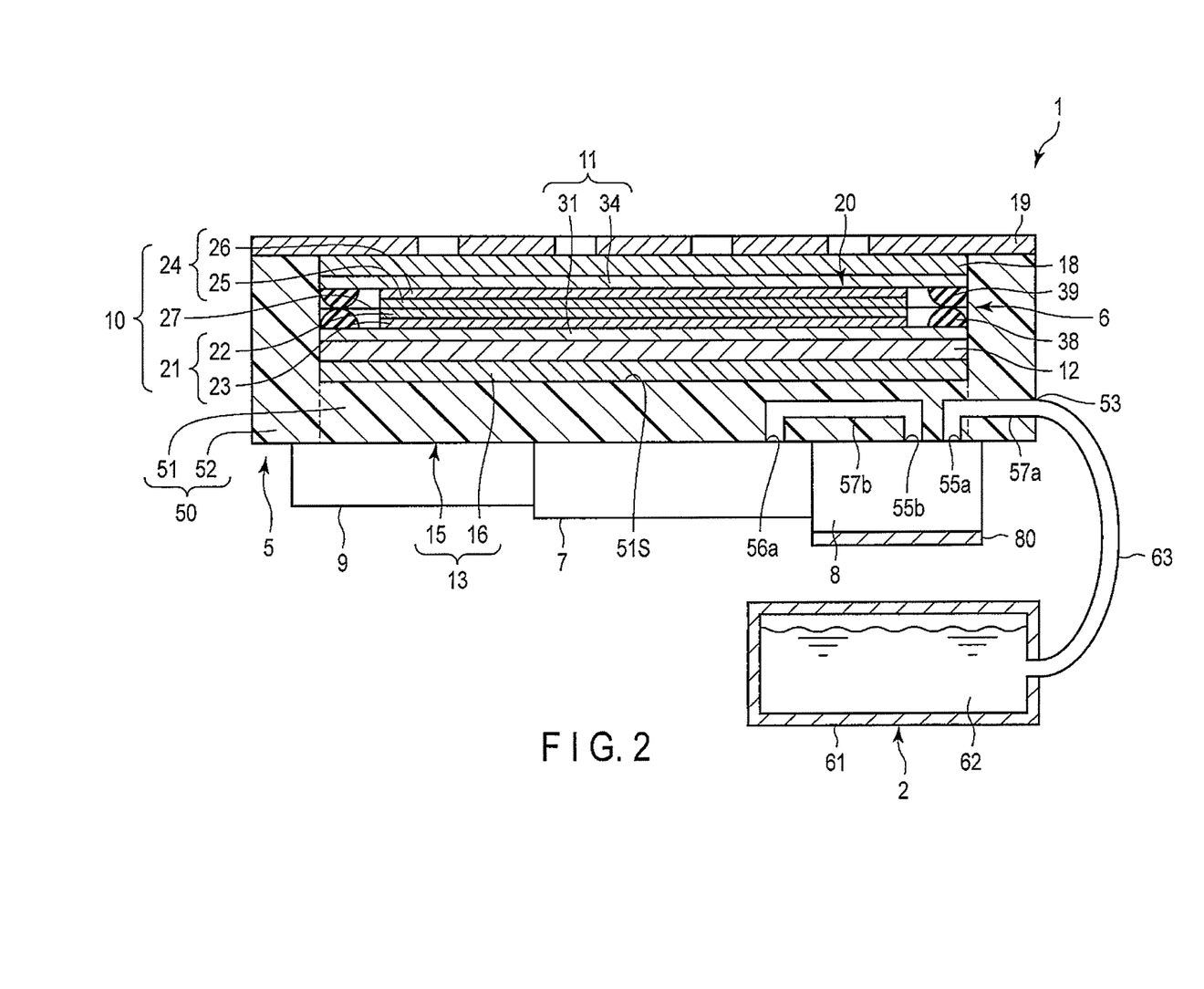
FIG. 2 is another cross-sectional view showing the fuel cell.

As shown in FIGS. 1 and 2, the fuel cell comprises a fuel cell module 1 and a fuel supply source 2 which contains a fuel and supplies the fuel cell module 1 with the fuel. The fuel cell module 1 comprises a fuel cell body 5, a pump 7, a valve 8, and a controller 9. FIG. 1 is a cross-sectional view of the fuel cell module 1, including the pump 7 and controller 9. FIG. 2 is another cross-sectional view of a different portion from FIG. 1, including the pump 7, controller 9 and valve 8 of the fuel cell module 1.

The fuel cell body 5 comprises an electric-power generator 6 comprising a membrane electrode assembly (MEA) 10, a current collector 11, an anode support plate 12, a fuel supply component 13, a humidity retention plate 18, and a cover plate 19.

As shown in FIGS. 1, 2, 3, and 4, the MEA 10 comprises an anode 21 as a fuel pole, a cathode 24 as an air pole arranged opposite to the anode 21 with a predetermined gap between the anode 21 and cathode 24, and an electrolytic membrane 27 held between the anode 21 and cathode 24. The fuel supply source 2 comprises a tube 63, and a fuel tank 61 which contains a fuel 62 and supplies the fuel for the fuel distribution mechanism 15 of the fuel supply component 13 by the tube 63.

In the fuel cell in the embodiment, the fuel 62 supplied from the fuel distribution mechanism 15 to the MEA 10 is consumed by an electric power generation reaction, and is thereafter returned neither to the fuel distribution mechanism 15 nor the fuel tank 61. Since the fuel cell of this type does not circulate the fuel, the fuel cell differs from a conventional active scheme and does not hinder downsizing of an apparatus. Since the pump 7 is used to supply a liquid fuel, the fuel cell of this type also differs from a pure passive scheme like a conventional inner-vaporization-type, and can be called, namely, a semi-passive type.

Figure 3:
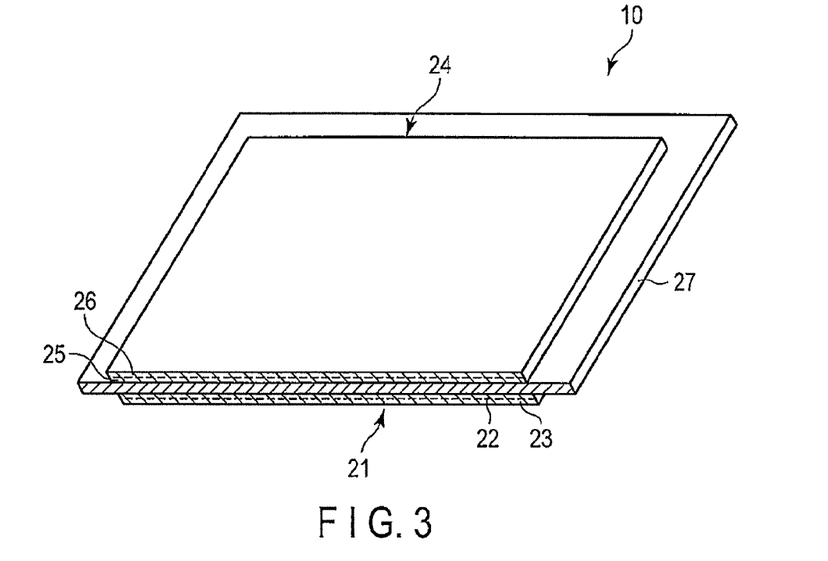
FIG. 3 is a perspective view schematically showing a partial cross-section of a membrane electrode assembly in the fuel cell.
Figure 4:
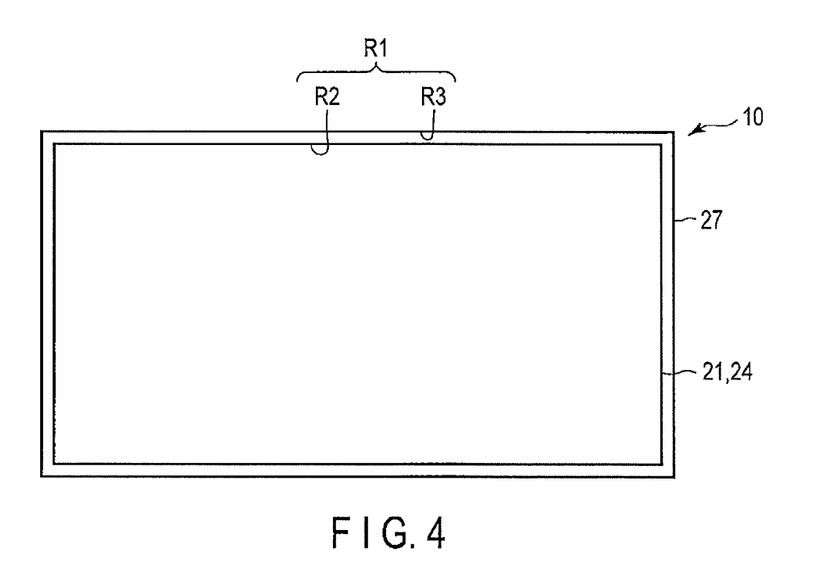
FIG. 4 is a plan view showing the membrane electrode assembly.

In the embodiment, the MEA 10 comprises a rectangular electric-power generation region R1. The electric-power generation region R1 comprises an effective region R2 which is effective for power generation, and an ineffective region R3 which surrounds the effective region R2. The effective region R2 is rectangular and has a major axis. Further, the MEA 10 comprises an electric-power generation element 20. The electric-power generation element 20 is rectangular and has a major axis, and overlaps the effective region R2.

The anode 21 comprises an anode catalyst layer 22, and an anode gas-diffusion layer 23 layered on the anode catalyst layer 22. The cathode 24 comprises a cathode catalyst layer 25, and a cathode gas-diffusion layer 26 layered on the cathode catalyst layer 25.

The anode catalyst layer 22 extracts electrons and protons by oxidizing the fuel supplied through the anode gas-diffusion layer 23. The cathode catalyst layer 25 causes the electrons and the protons generated in the anode catalyst layer 22 to react with each other by reducing the oxygen, thereby to generate water.

Catalysts contained in the anode catalyst layer 22 and the cathode catalyst layer 25 may be simple elements in a platinum group, such as Pt, Ru, Rh, Ir, Os, or Pd, or an alloy containing a platinum group metal. Methanol, or Pt—Ru or Pt—Mo which has strong resistance against carbon monoxide is preferably used for the anode catalyst layer 22. Pt or Pt—Ni is preferably used for the cathode catalyst layer 25. However, the catalysts are not limited to these, and various substances which are catalytically active can be used. The catalysts may be either supported catalysts, which use an electrically conductive support, or non-supported catalysts.

The electrolytic membrane 27 is a proton conductive membrane. The electrolytic membrane 27 transports protons generated in the anode catalyst layer 22 to the cathode catalyst layer 25. The electrolytic membrane 27 is made of a proton-conductive material which is not electronically conductive but can transport protons.

A material which forms the electrolytic membrane 27 may be fluorine-based resin such as a fluorosulfonic polymer having a sulfonic group (Nafion (product name, manufactured by Du Pont) or Flemion (product name, manufactured by Asahi Glass Co., Ltd.)), an organic material such as a hydrocarbon-based resin having the sulfonic group, or an inorganic material such as a tungstic acid or a phosphor tungstic acid. However, the proton-conductive material is not limited to these materials.

The anode gas-diffusion layer 23 serves to uniformly supply the anode catalyst layer 22 with the fuel, and has a function of collecting electrons from the anode catalyst layer 22. The cathode gas-diffusion layer 26 serves to uniformly supply the cathode catalyst layer 25 with an oxidant, and has a function of collecting electrons of the cathode catalyst layer 25. The anode gas-diffusion layer 23 and cathode gas-diffusion layer 26 are made of a porous base material.

As shown in FIGS. 1 and 2, the current collector 11 comprises an anode collector 31 and a cathode collector 34. The anode collector 31 and cathode collector 34 each can use a porous material layer (e.g., a mesh) or foil made of a metal material, such as gold or nickel, or a composite material made of an electrically-conductive metal material, such as stainless steel (SUS) covered with an excellently electrically a conductive metal such as gold.

The MEA 10 in the fuel cell body 5 is sealed liquid-tightly by insulating O-rings (sealing members) 38 and 39. Various spaces and gaps are formed inside the fuel cell body 5 by the O-rings 38 and 39.

The anode collector 31 is formed in a rectangular shape having a major axis, corresponding to the electric-power generation element 20, and comprises a plurality of fuel passage holes. The cathode collector 34 is formed in a rectangular shape having a major axis, corresponding to the electric-power generation element 20, and has a plurality of ventilation holes. The electric-power generation element 20 forming part of the MEA 10 is electrically connected by the anode collector 31 and cathode collector 34.

The O-rings 38 and 39 are made of, for example, rubber as an insulating material. The O-ring 38 is formed like a frame which surrounds outer periphery of the anode collector 31. The O-ring 39 is formed like a frame which surrounds outer periphery of the cathode collector 34.

As has been described above, a vaporized component of the fuel is supplied to the anode gas-diffusion layer 23 and anode catalyst layer 22 through the fuel passage holes (not shown) of the anode collector 31, by combining the MEA 10 with the anode collector 31. Therefore, the fuel cell body 5 is formed so as to supply the vaporized component of the fuel to the anode gas-diffusion layer 23 and anode catalyst layer 22.

For example, the vaporized component of the fuel can be supplied to the anode gas-diffusion layer 23 and anode catalyst layer 22 by arbitrarily providing a gas-liquid separation membrane (not shown) between the anode collector 31 and the fuel supply component 13. The O-ring 38 functions to prevent the fuel from leaking from the MEA 10.

Air as an oxidant penetrates the ventilation holes (not shown) in the cover plate 19 and the ventilation holes (not shown) in the cathode collector 34, and is supplied to the cathode gas-diffusion layer 26 and cathode catalyst layer 25. The O-ring 39 functions to prevent the oxidant from leaking from the MEA 10.

This embodiment shows the MEA 10 as having a structure in which one anode 21 and one cathode 24 are formed to oppose each other and sandwiched the electrolytic membrane 27. The structure of the MEA 10 is not limited to this example, and a different structure may be used. For example, the structure of the MEA 10 may be arranged such that four anodes 21 and four cathodes 24 are formed to oppose each other, sandwiched an identical electrolytic membrane 27 and electrically connected in series.

The anode support plate 12 is formed in a shape like a rectangular plate. The anode support plate 12 is held between the anode 21 and the fuel supply component 13. The anode support plate 12 may be provided when needed.

The anode support plate 12 comprises a plurality of fuel passage holes (not shown) which allow the fuel to pass through the MEA 10, more specifically, the anode 21. The fuel passage holes are arranged in a matrix. The anode support plate 12 described above is supplied with, as a fuel, a vaporized component of the liquid fuel 62.

The liquid fuel 62 is not limited to a methanol fuel such as a liquid methanol or an aqueous solution of methanol and may be, for example, an ethanol fuel such as an aqueous solution of ethanol or pure ethanol, a propanol fuel such as an aqueous solution of propanol or pure propanol, a glycol fuel such as an aqueous solution of glycol or pure glycol, dimethyl ether, formic acid, or any other liquid fuel. In any case, a liquid fuel which matches a fuel cell is used. The vaporized component of the liquid fuel 62 is vaporized methanol if liquid methanol is used as the liquid fuel 62. If an aqueous solution of methanol is used as the liquid fuel 62, the vaporized component is a mixed gas including a vaporized component of methanol and a vaporized component of water.

The fuel supply component 13 comprises the fuel distribution mechanism 15 and a fuel diffusion part 16. The fuel distribution mechanism 15 is positioned in a side opposite to the electrolytic membrane 27 in relation to the anode 21. The fuel diffusion part 16 is positioned between the anode 21 and the fuel distribution mechanism 15.

The fuel distribution mechanism 15 comprises a container 50, and thin tubes 57a, 57b, and 57c as tubes formed in the container 50. The container 50 comprises a bottom wall 51 and a peripheral wall 52 provided on outer edges of the bottom wall 51. The bottom wall 51 and peripheral wall 52 are formed integrally. The bottom wall 51 comprises a fuel discharge surface 51S opposed to the anode 21. The container 50 is open in the side opposite to the fuel discharge surface 51S. The container 50 contains the electric-power generator 6 in an inner surface side thereof.

The thin tube 57a is formed in the container 50 in a manner that a fuel inlet 53 and a fuel outlet 55a, which are provided by partially opening an outer surface of the container 50, communicate with each other. The fuel inlet 53 is provided in the peripheral wall 52, and the fuel outlet 55a is provided in the bottom wall 51.

The thin tube 57b is formed in the container 50 in a manner that a fuel inlet 55b and a fuel outlet 56a, which are provided by partially opening the outer surface of the container 50, communicate with each other. The fuel inlet 55b and fuel outlet 56a are provided in the bottom wall 51.

The thin tube 57c is formed in the container 50 in a manner that fuel discharge ports 54, which are provided by partially opening the fuel discharge surface 51S, and a fuel inlet 56b, which is provided by partially opening the outer surface of the container 50, communicate with each other. The fuel inlet 56b is provided in the bottom wall 51. Although the fuel discharge ports 54 are provided at a plurality of positions, the number, positions, and sizes of the fuel discharge ports 54 may be modified variously. The fuel discharge port 54 may be provided only at one position.

The liquid fuel 62 is injected from the fuel inlet 53. The liquid fuel 62 injected into the fuel inlet 53 is guided to the fuel discharge ports 54 through the thin tubes 57a, 57b, and 57c. The liquid fuel 62 or a vaporized component thereof is discharged from the fuel discharge ports 54. In this embodiment, the liquid fuel 62 is discharged from the fuel discharge ports 54.

The fuel diffusion part 16 is positioned between the anode 21 and the fuel distribution mechanism 15. Further, the fuel diffusion part 16 diffuses the liquid fuel 62 supplied from the fuel distribution mechanism 15, and discharges the fuel to the anode 21. The fuel diffusion part 16 may be provided where needed.

The fuel diffusion part 16 is formed in a sheet shape. The fuel diffusion part 16 is positioned on the discharge surface 51S. As has been described above, the fuel (a fuel gas) is supplied from the fuel diffusion part 16 to the anode 21 after the fuel is diffused by the fuel diffusion part 16.

The liquid fuel 62 discharged from the fuel discharge ports 54 is diffused in surface directions and then supplied to the anode 21. Therefore, the amount of the liquid fuel 62 supplied can be made uniform, and the fuel can be diffused uniformly over the anode 21, regardless of the direction and position of the liquid fuel 62. Therefore, uniformity of the electric-power generation reaction at the MEA 10 can be improved.

That is, distribution of the fuel to a surface of the anode 21 is equalized, and an adequate amount of fuel which is required for the electric-power generation reaction at the MEA 10 can be supplied. Accordingly, the electric-power generation reaction can be caused at the MEA 10 without enlarging the size or complicating of the fuel cell. In this manner, the output of the fuel cell can be improved. In other words, the output and stability of a passive fuel cell which does not circulate a fuel can be improved without impairing advantages of the passive fuel cell.

The humidity retention plate 18 is positioned outside the MEA 10, and is opposed to the cathode gas-diffusion layer 26. The humidity retention plate 18 is impregnated with a part of the water generated by the cathode catalyst layer 25, to thereby suppress vaporization of water, and has a function to uniformly introduce an oxidant to the cathode gas-diffusion layer 26, to thereby promote uniform diffusion of the oxidant (air) into the cathode catalyst layer 25. The humidity retention plate 18 is made of, for example, a member having a porous structure, a specific forming material of which may be a porous material of polyethylene or polypropylene. In this embodiment, the humidity retention plate 18 is a polyethylene foam sheet.

The cover plate 19 is positioned in a side opposite to the cathode collector 34 in relation to the humidity retention plate 18. The cover plate 19 has a substantially box-like appearance, and is made of, for example, stainless steel (SUS). The cover plate 19 has a plurality of ventilation holes to intake air as an oxidant. The ventilation holes are arranged, for example, in a matrix.

The fuel diffusion part 16, anode support plate 12, MEA 10, anode collector 31, cathode collector 34 and humidity retention plate 18 described above each have side surfaces covered with the peripheral wall 52. The cover plate 19 is provided with a plurality of extending parts which extend outside from the periphery. These extending parts are fixed to an outer surface of the container 50 by caulking or with screws. The fuel cell body 5 is formed in a manner as described above.

As shown in FIGS. 1, 2, 5, and 7, the pump 7 is attached to an outer surface of the container 50. In this embodiment, the pump 7 is a piezoelectric pump. The pump 7 is attached to the surface of the bottom wall 51 in a side opposite to the fuel discharge surface 51S. The pump 7 is fixed to the bottom wall 51 with screws 71. The pump 7 is connected directly to each of the fuel outlet 56a and the fuel inlet 56b.

Figure 7:
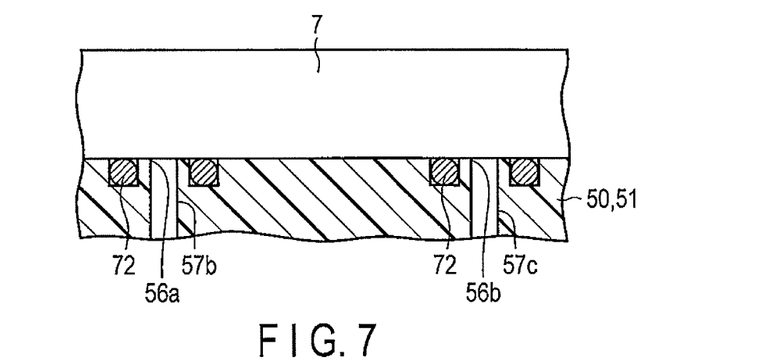
FIG. 7 is a cross-sectional view showing the pump.

Here, frame-shaped recesses are formed in the bottom wall 51 in an outer surface side, so as to surround the fuel outlet 56a and fuel inlet 56b, respectively. An O-ring 72 is provided in each of the recesses. The O-rings 72 are interposed between the bottom wall 51 and the pump 7, and can therefore connect liquid-tightly the fuel outlet 56a and the pump 7, as well as the fuel inlet 56b and the pump 7.

The pump 7 feeds the liquid fuel 62 introduced from the fuel outlet 56a to the fuel inlet 56b. The pump 7 is not a circulation pump which circulates a fuel but is a fuel supply pump which feeds the liquid fuel 62 to the fuel inlet 56b. Controllability of the fuel supply amount can be improved by feeding the liquid fuel 62 when needed.

Although the type of the pump 7 is not particularly limited, a piezoelectric pump as described above is preferably used from a viewpoint of ability to feed a small amount of liquid fuel 62 with excellent controllability and to achieve downsizing and weight reduction. As an alternative, a rotary pump (rotary vane pump), an electro-osmotic pump, a diaphragm pump, or a peristaltic pump can be used.

The rotary pump feeds a liquid by rotating vanes by a motor. The electro-osmotic pump uses a sintered porous material such as silica, which causes a phenomenon of electro-osmotic. The diaphragm pump feeds a liquid by driving a diaphragm by an electromagnet or piezoelectric ceramic. The peristaltic pump rolls and feeds a liquid by pressing a part of a flexible fuel flow path. Among them, the electro-osmotic pump and the diaphragm pump comprising piezoelectric ceramics are more preferably used in regard to power drive and size.

The pump 7 is operated, when needed, to supply the fuel supply component 13 with the liquid fuel 62. Even when the liquid fuel 62 is fed to the fuel supply component 13 by the pump 7, the fuel supply component 13 effectively functions, and the fuel supply amount to the MEA 10 can be therefore made uniform.

As shown in FIGS. 1, 2, 5, and 6, the valve 8 is attached to an outer surface of the container 50. In this embodiment, the valve 8 is a stop valve. The valve 8 is attached to the surface opposite to the fuel discharge surface 51S of the bottom wall 51. The valve 8 is fixed to the bottom wall 51 by fixing, with screws 81, a press frame 80 which presses the valve 8 against the bottom wall 51. The valve 8 is connected directly to each of the fuel outlet 55a and the fuel inlet 55b.

Figure 6:
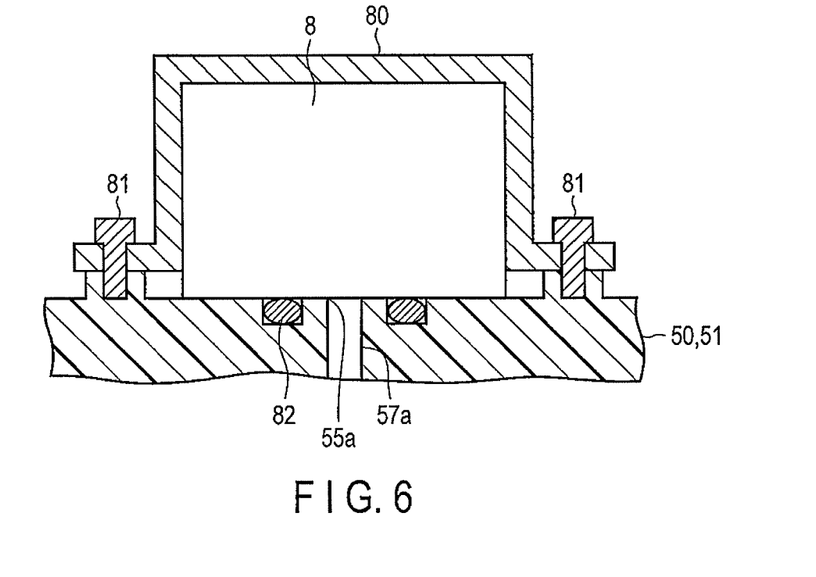
FIG. 6 is a cross-sectional view showing the valve.

Though not entirely shown, frame-shaped recesses are formed in the bottom wall 51 in the outer surface side thereof, so as to surround the fuel outlet 55a and the fuel inlet 55b, respectively. O-rings 82 are respectively provided in the recesses. The O-rings 82 are interposed between the bottom wall 51 and the valve 8, and can therefore liquid-tightly connect the fuel outlet 55a and the valve 8 as well as the fuel inlet 55b and the valve 8.

The valve 8 is connected to the pump 7 through the thin tube 57b. The valve 8 switches to open or close to feed the liquid fuel 62 to the fuel inlet 55b or not. The valve 8 controls an amount of the liquid fuel 62 supplied to the pump 7.

The valve 8 improves stability and reliability of the fuel cell. The valve 8 can avoid even slight fuel consumption, which inevitably occurs when the fuel cell is not used, and suction errors during reoperation of the pump as described above.

Figure 5:
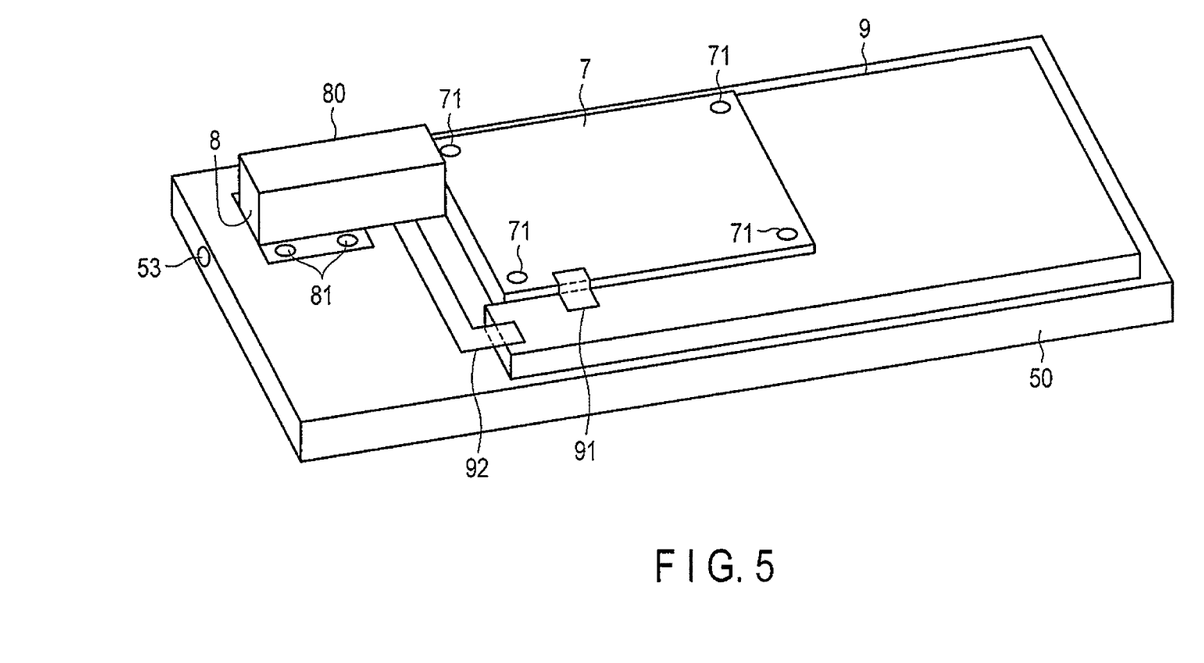
FIG. 5 is a perspective view showing the fuel cell module, and shows a pump, a valve, and a controller attached to an outer surface of a container.

As shown in FIG. 5, the controller 9 is attached to an outer surface of the container 50. In this embodiment, the controller 9 is a power converter circuit. The controller 9 is attached to a surface of the bottom wall 51 in a side opposite to the fuel discharge surface 51S. The controller 9 is fixed to the bottom wall 51. The controller 9 is electrically connected to the pump 7 by a wiring 91. The controller 9 is electrically connected to the valve 8 by a wiring 92. The controller 9 adjusts an electric-power generation amount at the electric-power generator 6 by controlling activation of the pump 7 and opening/closing of the valve 8. The fuel cell module 1 is formed as described above.

As shown in FIG. 2, the fuel supply source 2 comprises the fuel tank 61. The liquid fuel 62 is contained in the fuel tank 61. The fuel tank 61 and fuel inlet 53 are connected to each other by the tube 63. Therefore, the liquid fuel 62 is introduced into the fuel discharge surface 51S through the tube 63, thin tube 57a, valve 8, thin tube 57b, pump 7, and thin tube 57c. The fuel supply source 2 is formed as described above.

The fuel cell comprising the fuel cell module 1 and fuel supply source 2 is formed as described above.

Next, a mechanism of electric-power generation according to the fuel cell described above will be described.

At first, the valve 8 is switched to open to activate the pump 7 under control of the controller 9, and to introduce the liquid fuel 62 to the fuel discharge surface 51S from the fuel tank 61 through the tube 63, thin tube 57a, valve 8, thin tube 57b, pump 7, and thin tube 57c. The liquid fuel 62 is diffused by the fuel discharge surface 51S and fuel diffusion part 16.

Though not shown, the fuel supply component 13 may comprise, for example, a gas-liquid separation membrane provided between the anode collector 31 and the fuel diffusion part 16. In this manner, a vaporized component of the fuel can be supplied to the anode gas-diffusion layer 23 and anode catalyst layer 22.

In the MEA 10, the fuel is supplied to the anode catalyst layer 22, diffused by the anode gas-diffusion layer 23. When a methanol fuel is used as the liquid fuel 62, an internal reforming reaction for methanol, which is represented by expression (1), takes place in the anode catalyst layer 22. When pure methanol is used as a methanol fuel, water generated by the cathode catalyst layer 25 and water in the electrolytic membrane 27 are caused to react with methanol, thereby to cause an internal reforming reaction of the expression (1). Otherwise, an internal reforming reaction may be caused by any other reaction which requires no water.

$$CH_3OH+H_2O \rightarrow CO_2+6H^++6e^- \qquad (1)$$

Electrons ($e^-$) generated by this reaction are guided from a terminal (not shown) connected to the anode collector 31 to the outside, and activate, as so-called electricity, a mobile electronic device. The electrons are thereafter guided to the cathode 24 from a terminal (not shown) connected to the cathode collector 34. Protons ($H^+$) generated by an internal reforming reaction of the expression (1) are guided to the cathode 24 through the electrolytic membrane 27. Air is supplied as an oxidant to the cathode 24. The electrons ($e^-$) and protons ($H^+$) reached the cathode 24 react with oxygen in the air at the cathode catalyst layer 25, according to expression (2). In accordance with the reaction, water is generated.

$$6e^-+6H^++(3/2)O_2 \rightarrow 3H_2O \qquad (2)$$

As described above, electric-power generation is performed by the fuel cell.

Meanwhile, the present inventors prepared 1,000 fuel cells according to the foregoing embodiment, and investigated whether or not the liquid fuel 62 leaked between the pump 7 and the container 50 for each of the fuel cells. The investigation resulted in that no leakage occurred from any of the fuel cells.

As a comparative example, 1,000 fuel cells were also prepared in each of which the pump 7 and the container 50 were connected to each other by a tube. Whether or not the liquid fuel 62 leaked from the tube was investigated. The investigation resulted in that leakage of the liquid fuel 62 occurred in 30 of the 1000 fuel cells in the comparative example.

According to the fuel cell configured as described above, the fuel cell comprises the fuel cell module 1 and fuel supply source 2. The fuel cell module 1 comprises the electric-power generator 6, fuel distribution mechanism 15, and pump 7.

The electric-power generator 6 comprises the MEA 10 which comprises the anode 21, cathode 24, and electrolytic membrane 27. The fuel distribution mechanism 15 comprises the fuel discharge surface 51S, the container 50 which is open in a side opposed to the fuel discharge surface 51S and contains the electric-power generator 6 inside, and the thin tube 57c formed in the container 50 in a manner that the fuel discharge ports 54 provided by opening parts of the fuel discharge surface 51S and the fuel inlet 56b which is provided by opening a part of an outer surface of the container 50 communicate with each other. The pump 7 is attached to the outer surface of the container 50 and is connected directly to the fuel inlet 56b, to feed a fuel to the fuel inlet 56b.

The pump 7 is connected directly to the fuel inlet 56b. No tube part is configured to be interposed between the pump 7 and the fuel inlet 56b. Therefore, a problem of leakage of the liquid fuel 62, which occurs when any tube is interposed therebetween, can be eliminated. Further, the fuel cell in the foregoing embodiment can more reduce resistance which the liquid fuel 62 receives when the fuel is fed form the pump 7 to the fuel inlet 56b compared with a case of any tube interposed therebetween.

Similarly, no tube is interposed between the pump 7 and the fuel outlet 56a, between the valve 8 and the fuel outlet 55a, or between the valve 8 and the fuel inlet 55b.

Therefore, a highly reliable fuel cell can be achieved without leakage of the liquid fuel 62 and without interruption of supply of the liquid fuel 62. Further, the liquid fuel 62 can be supplied without a time lag.

A reliable fuel cell can be achieved by enlarging a size of the tube in each fuel cell in the comparative example. In this case, however, the enlarged size causes deterioration in degree of design freedom of a device. When a change is made in the design of the device, layout of a lot of internal devices needs to be reconsidered, which involves an increase in the number of design processes. Wirings which connect various internal devices are unavoidably thickened, the degree of freedom of the wirings deteriorates and enlarges an area occupied by the internal devices. From the above, enlarging of the size of the tube is not preferable.

The pump 7 is attached to the outer surface of the container 50. Therefore, the fuel cell can be downsized. The valve 8 and controller 9 are also attached to the outer surface of the container 50. Therefore, the fuel cell can be more downsized.

Since the pump 7, valve 8, and controller 9 are close to each other, the wirings 91 and 92 described above can be shorter. As the wirings 91 and 92 are shorter, the wiring resistance can be accordingly reduced, and the calorific value of heat generated from the wirings 91 and 92 can be reduced.

The fuel cell body 5, pump 7, valve 8, and controller 9 are built in a module which forms the fuel cell module 1. Therefore, the fuel cell module 1 can be applied to various products. As use purposes widen, mass production of fuel cell modules 1 becomes possible so that production costs and, eventually, costs for products can be reduced.

When a problem occurs in the fuel cell module 1, the fuel cell module 1 can be replaced, although the fuel cell module 1 can also be repaired. Thus, ease of maintenance improves.

From the above, a highly reliable fuel cell can be obtained.

This embodiment is not limited exactly to forms as described in the embodiment but may be practiced with constitutive elements variously modified within a scope not deviating from the subject matter of the embodiment. Further, various forms can be derived by appropriately combining a plurality of constitutive elements disclosed in the embodiment. For example, several constitutive elements may be deleted from all the constitutive elements disclosed in the embodiment.

For example, when the pump 7, valve 8, and controller 9 are attached to the outer surface of the container 50, the outer surface is not limited to the outer surface of the bottom wall 51 but may be an outer surface of the peripheral wall 52.

The press frame 80 may be made of resin. The valve 8 may be fixed to the container 50 by welding the press frame 80 to the container 50. The pump 7 is not limited to fixture with screws but may be fixed to the container 50 by using an unillustrated press frame made of resin.

The pump 7 and valve 8 may be fixed to the container 50 by welding to the container 50.

In the embodiment described above, the container 50 is made of resin. However, not only this container but also a container 50 made of metal may be used or a metal member such as a metal plate may be provided on an outer surface of a container 50 made of resin. In this case, the pump 7 and valve 8 may be welded to the container 50 made of metal or the metal member.

The press frame 80 may be made of metal. In this case, the valve 8 may be fixed by welding the press frame 80 to a container 50 made of metal or a metal member. Also, the pump 7 may be fixed by welding an unillustrated press frame made of metal to a container 50 made of metal or a metal member.

Control of the pump 7 by the controller 9 is preferably performed, for example, by referring to an output of the fuel cell. The output of the fuel cell is detected by the controller 9. Based on a detection result thereof, a control signal is fed to the pump 7. The pump 7 is controlled to turn on/off, based on the control signal fed from the controller. More stable operation of the pump 7 can be achieved by performing control based on temperature information and operational status information of an electronic device as a power supply target, in addition to the output of the fuel cell.

A specific operation control method for the pump 7 may be a method in which, for example, when the output from the fuel cell exceeds a predetermined definite value, the pump 7 is stopped or a liquid feed amount is reduced, and when the output decreases to be lower than the definite value, operation of the pump 7 is restarted or the liquid feed amount is increased. Another operation control method may be one in which when a rate of change of the output from the fuel cell is positive, operation of the pump 7 is stopped or a liquid feed amount is reduced, and when the rate of change of the output from the fuel cell becomes negative, operation of the pump 7 is restarted or the liquid feed amount is increased.

The fuel tank 61 and the tube 63 are preferably equipped with a balance valve which balances the pressure inside the fuel tank 61 with outside air. The balance valve is provided in, for example, the fuel tank 61. Though not shown, the balance valve comprises a valve needle, a spring which moves the valve needle depending on the pressure inside the fuel tank 61, and a seal part which seals the valve needle into a closed state.

These embodiments are not limited to direct methanol fuel cells and are applicable to other fuel cells. Further, the liquid fuel 62 is not always limited to a methanol fuel. The liquid fuel 62 is effective when various types of liquid fuels are used. Types and densities of liquid fuels are not limited.

Although a liquid fuel which is supplied to the MEA 10 may take the form of vapor of the liquid fuel, a case of supplying the liquid fuel partially liquidized also applies.

Several embodiments have been described above. The embodiments are disclosed herein as examples only and are not intended to limit the scope of the invention. In practice, a novel fuel cell as described herein may be realized in various different forms. Further, various omissions, substitutions, and modifications can be made in the embodiments described herein without deviating from the subject matter of the invention. The appended claims and equivalents thereof are intended to cover such forms or modifications to be included in the scope and subject matter of the invention.

The present application is based upon and claims the benefit of priority of antecedent Japanese Patent Application No. 2009-184773 filed on Aug. 7, 2009, and covers herein the whole contents of the antecedent application by reference.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A fuel cell comprising:
an electric-power generator comprising a membrane electrode assembly which comprises an anode, a cathode, and an electrolytic membrane held between the anode and the cathode;
a fuel distribution mechanism comprising:
a container configured to contain the electric-power generator, the container comprising:
a fuel discharge surface opposed to the anode;
a fuel outlet opening in the fuel discharge surface; and
a fuel inlet opening in an outer surface of the container; and
a thin tube, formed in the container in a manner that the fuel outlet and the inlet communicate with each other through the thin tube; and
a pump directly attached to the outer surface of the container, in direct physical contact with the fuel inlet, and configured to feed fuel to the fuel inlet.

2. The fuel cell of claim 1, further comprising a valve attached to the outer surface of the container, connected to the pump, and configured to control an amount of the fuel supplied to the pump.

3. The fuel cell of claim 1, further comprising a controller attached to the outer surface of the container, and configured to adjust an electric-power generation amount at the electric-power generator.

4. The fuel cell of claim 1, wherein the outer surface of the container is a surface opposite to the fuel discharge surface.

5. The fuel cell of claim 2, wherein the fuel distribution mechanism comprises another thin tube which is connected to the pump and the valve and is formed in the container.

6. The fuel cell of claim 1, further comprising a fuel tank which contains the fuel and is connected to the pump.

7. The fuel cell of claim 1, wherein the container comprises an opening configured to intake air to the cathode.

* * * * *

UNITED STATES PATENT AND TRADEMARK OFFICE
CERTIFICATE OF CORRECTION

| | |
|---|---|
| PATENT NO. | : 8,835,068 B2 |
| APPLICATION NO. | : 13/364919 |
| DATED | : September 16, 2014 |
| INVENTOR(S) | : Hasebe et al. |

It is certified that error appears in the above-identified patent and that said Letters Patent is hereby corrected as shown below:

In the Claims

Claim 1, column 11, lines 19-20, "the fuel outlet and the inlet" should read --the fuel outlet and the fuel inlet--.

Signed and Sealed this
Twenty-fourth Day of March, 2015

Michelle K. Lee
*Director of the United States Patent and Trademark Office*